Oct. 6, 1931.  F. H. LEEK  1,825,674
BRAKE CONSTRUCTION
Filed April 23, 1928

FREDERICK H. LEEK
by Hastings W. Baker
his atty.

Patented Oct. 6, 1931

1,825,674

UNITED STATES PATENT OFFICE

FREDERICK H. LEEK, OF CLEVELAND, OHIO

BRAKE CONSTRUCTION

Application filed April 23, 1928. Serial No. 272,002.

This invention relates to an improved brake construction and more specifically constitutes an improvement in a lining for brakes.

Fabric linings have heretofore been used for brakes on automobiles but it is well known that a fabric lining rapidly wears and when the brake is used excessively the heat produced is frequently sufficient to destroy the fabric. This is especially noticeable in cars descending a mountain grade where the brakes are constantly used for an extended period. As a result, many repair stations are found at the foot of mountain grades, which repair stations make a specialty of relining the brakes.

I propose to use Babbitt-metal instead of fabric as the brake lining. I have found that with the use of Babbitt-metal there is practically no friction but in the construction which I employ the Babbitt-metal grips, bringing the car to a stop with very little friction so that there is not a sufficient amount of heat developed to destroy the brake lining. In order to keep the Babbitt-metal in position I employ an iron casting provided with recesses in which I place the Babbitt-metal.

Another object of the invention is to provide a structure whereby all squeaking of the brake is eliminated.

Figure 1:
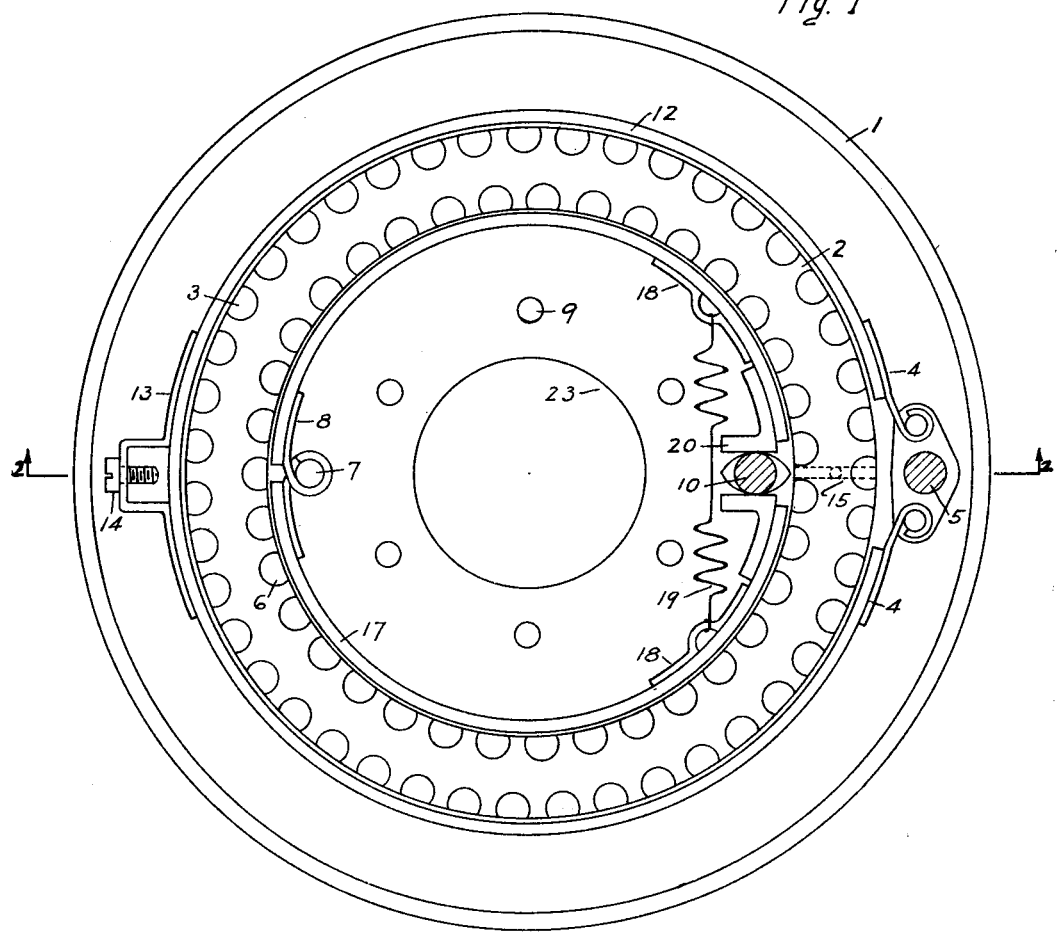
Figure 2:
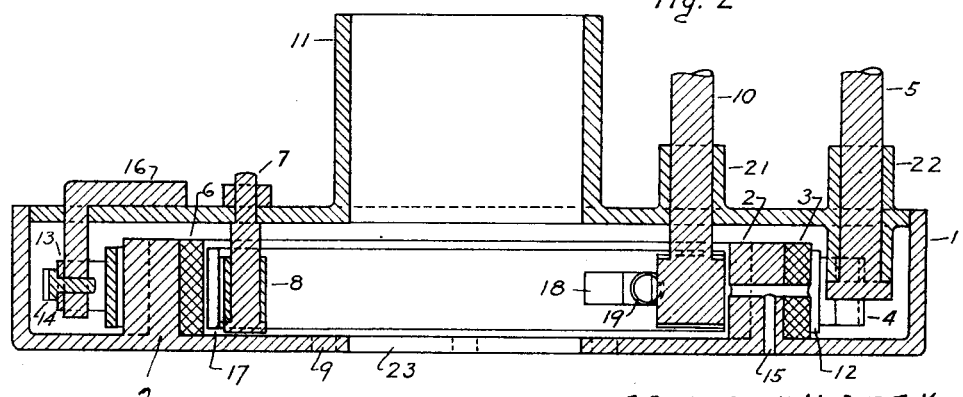

Referring more particularly to the drawings,

Fig. 1 is an elevational view partly in cross-section of my brake construction, and Fig. 2 is a cross-sectional view thereof on the line 2—2 of Fig. 1.

In my preferred construction I use a brake drum 1, preferably made out of steel, carrying a brake flange or casting 2. The casting 2 is provided with a plurality of apertures or recesses filled with Babbitt-metal 3 and 6. These recesses are on both the outer and the inner peripheries of the casting 2 so that the Babbitt-metal will directly engage the brake bands 12 and 17. The outer brake band 12 is secured to clips 4 operatively connected to the rotatable shaft 5, which is operated by the foot brake in the conventional manner. The inner periphery of the casting 2 has recesses filled with Babbitt-metal 6, which Babbitt-metal engages the inner spring steel band 17, to which is attached clips 8 which are bent around a pin 7, which is secured to the back of the housing 11 as shown in Fig. 2, which housing is secured to the axle housing in the conventional manner. The other side of the band 17 is provided with expanders 20 on opposite sides of cams on the emergency shaft 10, which shaft is rotated in the conventional manner to cause the inner spring steel band 17 to expand and grip the Babbitt-metal 6. Spring clips 18 are provided near the expanders 20 and secuerely attached to the band 17, which clips 18 are connected by means of a spring 19.

The casting 2 is provided with an oil hole 15 whereby the parts may be lubricated. The stationary housing 11 is provided with housings 21 and 22 in which the shafts 10 and 5 respectively are journaled. The hole 23 is provided in the brake drum 1 to receive the axle, not shown, and the brake drum 1 is secured to the wheel by means of bolts 9. The spring band 12 is also provided with a clip 13 which receives a set screw 14 secured to a stationary L plate 16 secured to the housing 11 so as to hold the band 12 in position.

By such a construction it is apparent that the brake drum 1 revolves and the housing 11 is stationary. The spring band 12 is held in a stationary position by means of the L plate 16, set screw 14 and clip 13. The inner brake band 17 is held in position by means of the pin 7 and clips 8. The outer band 12 is contracted by rotating the shaft 5, and the inner band 17 is expanded by rotating the shaft 10. When either the inner band or the outer band is thus actuated the Babbitt-metal in the pockets is engaged. Babbitt-metal is an anti-friction metal so that there would be a minimum of friction between the brake bands and the Babbitt-metal. Babbitt-metal grips steel so that the car would be effectively braked with no grinding action and not a perceptible degree of heat. A car could be run indefinitely with the brakes on and only a negligible amount of heat would be developed when my construction was employed.

While I have shown this invention as applied to an automobile brake I do not intend to limit myself to such a construction but desire to claim this invention broadly regardless of the use to which it may be applied. It is obvious that many changes may be made in the specific construction herein shown and I, therefore, reserve to myself the right to make all such changes as may fairly fall within the scope of the appended claims.

I claim:

1. In a brake construction, a brake band, a brake flange having recesses in its periphery, Babbitt-metal carried in said recesses, and means whereby said band is forced into contact with said Babbitt-metal.

2. In a brake construction, a brake flange, a brake band encircling said flange, a brake band within said flange, said flange being composed partly of Babbitt-metal, and means whereby either of said bands may be forced into contact with said Babbitt-metal.

3. In a brake construction, a brake flange composed partly of Babbitt-metal, outer and inner brake bands, and means whereby either of said bands and Babbitt-metal are brought into contact.

4. In a brake construction, a brake flange composed partly of Babbitt-metal, inner and outer brake bands, means whereby the outer brake band is contracted and the inner brake band is expanded so as to bring either of said brake bands into contact with said Babbitt-metal.

5. In a brake construction, a rotatable brake flange, a brake band. means to hold said brake band relatively stationary, said brake flange having recesses therein, Babbitt-metal within said recesses, and means whereby the said band is forced into contact with said Babbitt-metal.

6. In a brake construction, a rotatable brake flange composed partly of Babbitt-metal, a plurality of brake bands relatively stationary, and means whereby either of said bands is forced into contact with said Babbitt-metal.

7. In a brake construction, a brake band, a brake flange having recesses therein, Babbitt-metal within said recesses, means whereby the said band is forced into contact with said Babbitt-metal, and means whereby the contacting surfaces of said band and flange may be lubricated.

8. In a brake construction, a stationary housing, a rotatable brake drum, a flange carried thereby and having recesses therein, Babbitt-metal within said recesses, a brake band carried by said housing, and means whereby said brake band is forced into contact with said Babbitt-metal.

In testimony whereof I affix my signature.

FREDERICK H. LEEK.